(12) United States Patent
Frank et al.

(10) Patent No.: US 9,558,048 B2
(45) Date of Patent: Jan. 31, 2017

(54) SYSTEM AND METHOD FOR MANAGING MESSAGE QUEUES FOR MULTINODE APPLICATIONS IN A TRANSACTIONAL MIDDLEWARE MACHINE ENVIRONMENT

(75) Inventors: Richard Frank, Naples, FL (US); Todd Little, Palatine, IL (US); Arun Kaimalettu, Kerala (IN); Leonard Tominna, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 317 days.

(21) Appl. No.: 13/572,501

(22) Filed: Aug. 10, 2012

(65) Prior Publication Data

US 2013/0086199 A1    Apr. 4, 2013

Related U.S. Application Data

(60) Provisional application No. 61/542,119, filed on Sep. 30, 2011.

(51) Int. Cl.
*G06F 13/14* (2006.01)
*G06F 13/16* (2006.01)
(Continued)

(52) U.S. Cl.
CPC ............... *G06F 9/544* (2013.01); *G06F 9/546* (2013.01); *G06F 2209/548* (2013.01)

(58) Field of Classification Search
CPC ..... G06F 9/546; G06F 2209/548; G06F 9/544
(Continued)

(56) References Cited

U.S. PATENT DOCUMENTS

| | | |
|---|---|---|
| 5,499,349 A | 3/1996 | Nikhil |
| 5,784,615 A | 7/1998 | Lipe |

(Continued)

FOREIGN PATENT DOCUMENTS

| | | |
|---|---|---|
| CN | 1909485 A | 2/2007 |
| CN | 101719960 A | 6/2010 |

(Continued)

OTHER PUBLICATIONS

European Patent Office, International Searching Authority, International Search Report and Written Opinion dated Feb. 26, 2013 for International Application No. PCT/US2012/057634, 8 pages.

(Continued)

*Primary Examiner* — Kevin Bates
*Assistant Examiner* — Mark A. Scott
(74) *Attorney, Agent, or Firm* — Tucker Ellis LLP (57) ABSTRACT

A middleware machine environment can manage message queues for multimode applications. The middleware machine environment includes a shared memory on a message receiver, wherein the shared memory maintains one or more message queues for the middleware machine environment. The middleware machine environment further includes a daemon process that is capable of creating at least one message queue in the shared memory, when a client requests that the at least one message queue be set up to support sending and receiving messages. Additionally, different processes on a client operate to use at least one proxy to communicate with the message server. Furthermore, the middleware machine environment can protect message queues for multimode applications using a security token created by the daemon process.

20 Claims, 6 Drawing Sheets

(51) Int. Cl.
*G06F 13/28* (2006.01)
*G06F 15/167* (2006.01)
*G06F 9/54* (2006.01)

(58) Field of Classification Search
USPC .......................................... 709/213; 710/28
See application file for complete search history.

(56) References Cited

U.S. PATENT DOCUMENTS

| | | | |
|---|---|---|---|
| 6,557,056 B1 | 4/2003 | Lanteigne et al. | |
| 6,766,358 B1 | 7/2004 | Chesson et al. | |
| 6,871,265 B1 | 3/2005 | Oren | |
| 7,953,903 B1* | 5/2011 | Finkelstein | H04L 12/4641 |
| | | | 710/104 |
| 2002/0062356 A1* | 5/2002 | Clarke et al. | 709/213 |
| 2002/0129085 A1* | 9/2002 | Kubala | G06F 9/5083 |
| | | | 718/104 |
| 2002/0129172 A1* | 9/2002 | Baskey | G06F 9/544 |
| | | | 719/310 |
| 2005/0131883 A1* | 6/2005 | Buxton et al. | 707/3 |
| 2005/0251856 A1* | 11/2005 | Araujo | H04L 63/123 |
| | | | 726/12 |
| 2006/0056413 A1* | 3/2006 | Ikeda et al. | 370/392 |
| 2006/0149840 A1* | 7/2006 | Thompson | H04L 12/5695 |
| | | | 709/224 |
| 2006/0288228 A1* | 12/2006 | Botz | G06F 21/31 |
| | | | 713/182 |
| 2007/0078995 A1* | 4/2007 | Benard et al. | 709/230 |
| 2007/0101341 A1* | 5/2007 | Downing et al. | 719/314 |
| 2007/0156808 A1* | 7/2007 | Koegel et al. | 709/203 |
| 2007/0162457 A1* | 7/2007 | Barcia et al. | 707/10 |
| 2007/0299973 A1 | 12/2007 | Borgendale et al. | |
| 2008/0069098 A1 | 3/2008 | Shah et al. | |
| 2008/0126564 A1* | 5/2008 | Wilkinson | 709/242 |
| 2008/0244613 A1* | 10/2008 | Parthasarathy et al. | 719/313 |
| 2009/0119676 A1 | 5/2009 | Supalov et al. | |
| 2010/0138534 A1* | 6/2010 | Mutnuru | H04L 43/0817 |
| | | | 709/224 |
| 2010/0153546 A1* | 6/2010 | Clubb | H04L 1/1635 |
| | | | 709/224 |
| 2010/0250684 A1* | 9/2010 | Naish | 709/206 |
| 2011/0107406 A1* | 5/2011 | Frost | G06F 9/45558 |
| | | | 726/6 |
| 2011/0154443 A1* | 6/2011 | Thakur | G06F 21/41 |
| | | | 726/3 |
| 2011/0219208 A1 | 9/2011 | Asaad | |
| 2011/0302569 A1* | 12/2011 | Kunze | G06F 8/62 |
| | | | 717/169 |
| 2012/0023296 A1* | 1/2012 | Yan | G06F 12/08 |
| | | | 711/147 |
| 2012/0066616 A1* | 3/2012 | Woods et al. | 715/752 |
| 2012/0110572 A1* | 5/2012 | Kodi et al. | 718/1 |
| 2012/0174124 A1* | 7/2012 | Ward et al. | 719/331 |
| 2012/0179837 A1* | 7/2012 | Bender et al. | 709/238 |
| 2012/0216216 A1* | 8/2012 | Lopez Taboada | G06F 9/546 |
| | | | 719/314 |
| 2012/0221774 A1* | 8/2012 | Atkisson et al. | 711/103 |
| 2012/0254480 A1* | 10/2012 | Tamir | G06F 13/385 |
| | | | 710/22 |
| 2012/0254889 A1* | 10/2012 | Demkowicz et al. | 718/107 |
| 2012/0331153 A1* | 12/2012 | Aho | G06F 15/17356 |
| | | | 709/227 |
| 2013/0007377 A1* | 1/2013 | Winn et al. | 711/147 |
| 2013/0007412 A1* | 1/2013 | Krishnamurthy | G06F 15/76 |
| | | | 712/30 |
| 2013/0275631 A1* | 10/2013 | Magro | G06F 13/14 |
| | | | 710/28 |

FOREIGN PATENT DOCUMENTS

| | | |
|---|---|---|
| JP | H0721038 A | 1/1995 |
| JP | 2005284840 A | 10/2005 |
| JP | 2010165022 A | 7/2010 |
| JP | 2013513860 A | 4/2013 |
| WO | 2011071624 A | 6/2011 |

OTHER PUBLICATIONS

Search Report issued by Chinese Patent Office for Chinese patent application No. 201280047474.0, mailed May 30, 2016 (2 pages).
Wang et al., "Design and Implementation of a Message Queuing Middleware", Computer Engineering, vol. 31, No. 21, Nov. 2005, pp. 81-83 (3 pages).
Office Action issued by United States Patent and Trademark Office on U.S. Appl. No. 13/572,491, mailed Jul. 18, 2016 (15 pages).
Office Action issued by Japanese Patent Office on Japanese patent application No. 2014-533333, mailed Sep. 27, 2016 (7 pages).

* cited by examiner

SYSTEM AND METHOD FOR MANAGING MESSAGE QUEUES FOR MULTINODE APPLICATIONS IN A TRANSACTIONAL MIDDLEWARE MACHINE ENVIRONMENT

CLAIM OF PRIORITY

This application claims the benefit of priority on U.S. Provisional Patent Application No. 61/542,119, entitled "SYSTEM AND METHOD FOR PROVIDING MESSAGE QUEUES FOR MULTINODE APPLICATIONS IN A TRANSACTIONAL MIDDLEWARE MACHINE ENVIRONMENT" filed Sep. 30, 2011, which application is herein incorporated by reference.

CROSS-REFERENCED APPLICATIONS

The current application hereby incorporates by reference the material in the following patent applications:

U.S. patent application Ser. No. 13/572,491, entitled "SYSTEM AND METHOD FOR PROVIDING MESSAGE QUEUES FOR MULTINODE APPLICATIONS IN A MIDDLEWARE MACHINE ENVIRONMENT," filed Aug. 10, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to supporting a transactional middleware machine environment.

BACKGROUND

A transactional middleware system, or transaction oriented middleware, includes enterprise application servers that can process various transactions within an organization. With the developments in new technologies such as high performance network and multiprocessor computers, there is a need to further improve the performance of transactional middleware. These are the generally areas that embodiments of the invention are intended to address.

SUMMARY

Described herein is a system and method for managing message queues in a middleware machine environment. A server machine in the middleware machine environment comprises a shared memory on a message receiver and a daemon process. Here, the shared memory maintains one or more message queues in the middleware machine environment. The daemon process is capable of creating at least one message queue in the shared memory, when a client requests that the at least one message queue be set up to support sending and receiving messages.

DETAILED DESCRIPTION

Described herein is a system and method for supporting a transactional middleware system that can take advantage of fast machines with multiple processors, and a high performance network connection in a transactional middleware machine environment. The system can provide message queues for multimode applications using a data structure based on a ring buffer (a circular queue). The system includes a remote ring structure with a first ring structure on a reader and a second ring structure on a writer, wherein each of the first ring structure and the second ring structure has a head pointer and a tail pointer. When the writer operates to write a message to the remote ring, the writer can update the head pointers for both the first ring structure and the second ring structure, and the data in the remote ring structure. When the reader operates to read a message from the remote ring, the reader can update the tail pointers for both the first ring structure and the second ring structure. Additionally, the message can be stored in a heap data structure, while the metadata associated with the message can be stored in the remote ring structure.

In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. The system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

In accordance with an embodiment of the invention, Tuxedo is a set of software modules that enables the construction, execution, and administration of high performance, distributed business applications and has been used as transactional middleware by a number of multi-tier application development tools. Tuxedo is a middleware platform that can be used to manage distributed transaction processing in distributed computing environments. It is a proven platform for unlocking enterprise legacy applications and extending them to a services oriented architecture, while delivering unlimited scalability and standards-based interoperability.

Message Queues for Multinode Applications

In accordance with an embodiment of the invention, messaging software, such as messaging queues, can take advantage of a high performance network, such as an IB network using a remote direct memory access (RDMA) protocol. The RDMA protocol allows a message sender to bypass OS kernels and directly access to the memory without a need to wake up a process on the remote machine.

Figure 1:
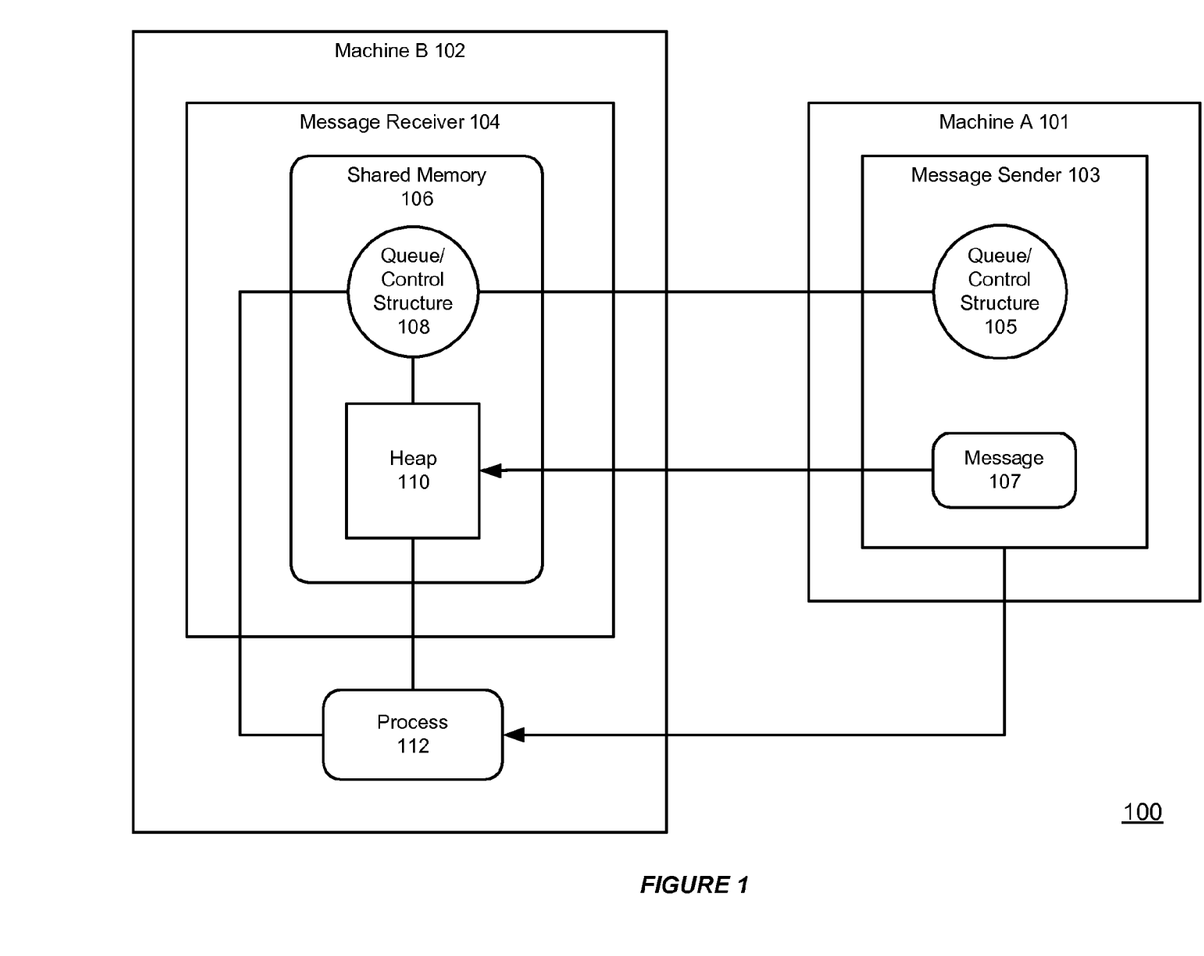
FIG. 1 shows an illustration of providing message queues for multimode applications in a middleware machine environment, in accordance with an embodiment of the invention.

FIG. 1 shows an illustration of providing message queues for multimode applications in a middleware machine environment, in accordance with an embodiment of the invention. As shown in FIG. 1, a middleware machine environment 100 can include multiple server machines, such as Machine A 101 and Machine B 102. A message sender 103 on a local machine, e.g. Machine A 101, can send a message 107 to a message receiver 104 on a remote machine, e.g. Machine B 102. The message receiver 104 on the remote Machine B 102 can use a shared memory 106 that includes a message queue or a message control data structure 108 and a heap data structure 110.

In accordance with an embodiment of the invention, a message queue can contain only the metadata information that is associated with the message, while the heap data structure contains the physical message. Thus, messages with variable size can be easily accommodated and be stored in the shared memory. As shown in FIG. 1, the message sender 103 operates to write the message directly into the heap data structure 110, and maintain metadata associated with the message in the message control data structure 108.

Also as shown in FIG. 1, the message sender 103 includes a message control data structure 105 on the local machine, Machine A 101. The message control data structure 105 can be a copy of the message queue 108 for the message sender 103. The message sender on the local Machine A 101 can further maintain metadata associated with the message in the message control data structure 105 on the local Machine A 101.

In accordance with an embodiment of the invention, a message sender on a local Machine A 101 can directly write a message into heap data structure 110 in a shared memory 106 on the remote Machine B 102. As shown in FIG. 1, the message sender 103 can bypass the OS kernel on the remote Machine B 102, with the addressing information provided by the message receiver 104. Furthermore, the message sender 103 on the local Machine A 101 can update the status information of the message such as an input sequence number in the queue in the remote Machine B 102 via the control structure on the local Machine A 101.

Furthermore, the message sender 103 on the local Machine A 101 can send a message to a message receiver 104 regardless the size of the message. Hence, this messaging mechanism can be cost effective, efficient, and requires less overhead for large volume of data.

Additionally, the message sender 103 can wake up a process 112 on the remote Machine B 102 that is associated with the message receiver 104, according to a pre-configured procedure. For example, the message sender can wake up the process when a service request message that can be handled by the process has delivered. In another example, the message sender can wake up a daemon process on the remote Machine B 102 when the queue is full.

In accordance with an embodiment of the invention, before a process on the message receiver, e.g. process 112, goes to sleep, the process can notice the message control structure 105 on the client side, and/or provide a procedure to the message control structure 105 on how to wake itself up. Then, the process on the receiver side can wait for the delivery of the message. For example, a process that is expecting the message can be in a sleeping status until it is wakened up by the message sender.

Also as shown in FIG. 1, after a message receiver 104 consumes a message, the message receiver can take the message out from the queue, in which case the message receiver can update the message queue 108 and the control structure 105 on the sender side by performing a RDMA write operation. Such a RDMA write operation can be performed in a manner without intervention from the client on the remote Machine B 102.

In accordance with an embodiment of the invention, in order to support two-way communications between two servers in a middleware machine environment, each server on the middleware machine can be provided with a receiver and a sender. Thus, the communication between these two servers can be performed by different message senders at the different machines, using RDMA protocol such as RDMA write operations.

Figure 2:
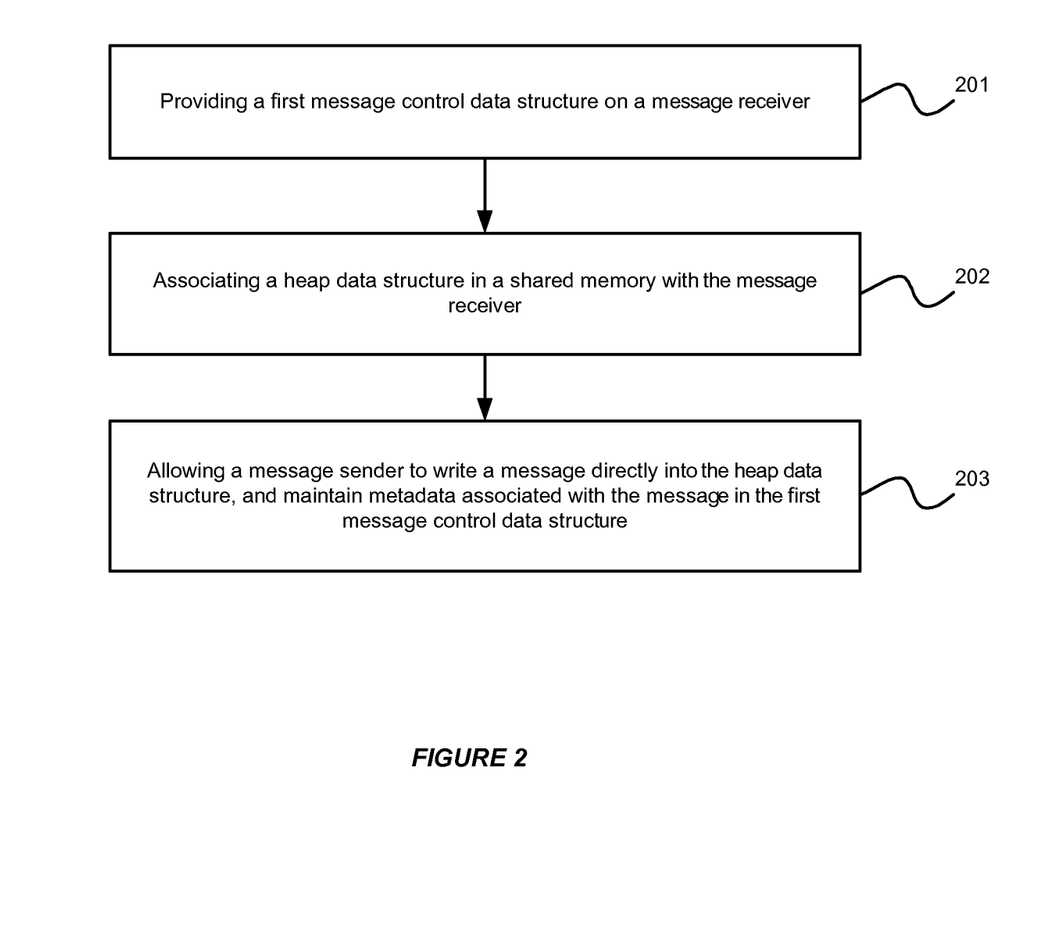
FIG. 2 illustrates an exemplary flow chart for supporting accurate load balance in a middleware machine environment, in accordance with an embodiment of the invention.

FIG. 2 illustrates an exemplary flow chart for providing message queues for multimode applications in a middleware machine environment, in accordance with an embodiment of the invention. As shown in FIG. 2, at step 201, the system can provide a first message control data structure on a message receiver. At step 202, the system can associate a heap data structure in a shared memory with the message receiver. Then, at 203, the system allows a message sender to write a message directly into the heap data structure, and maintain metadata associated with the message in the first message control data structure.

Message Queue Creation and Management

In accordance with an embodiment of the invention, a daemon process on a server node in the middleware machine environment can be used to create and manage the message queue in the shared memory.

Figure 3:
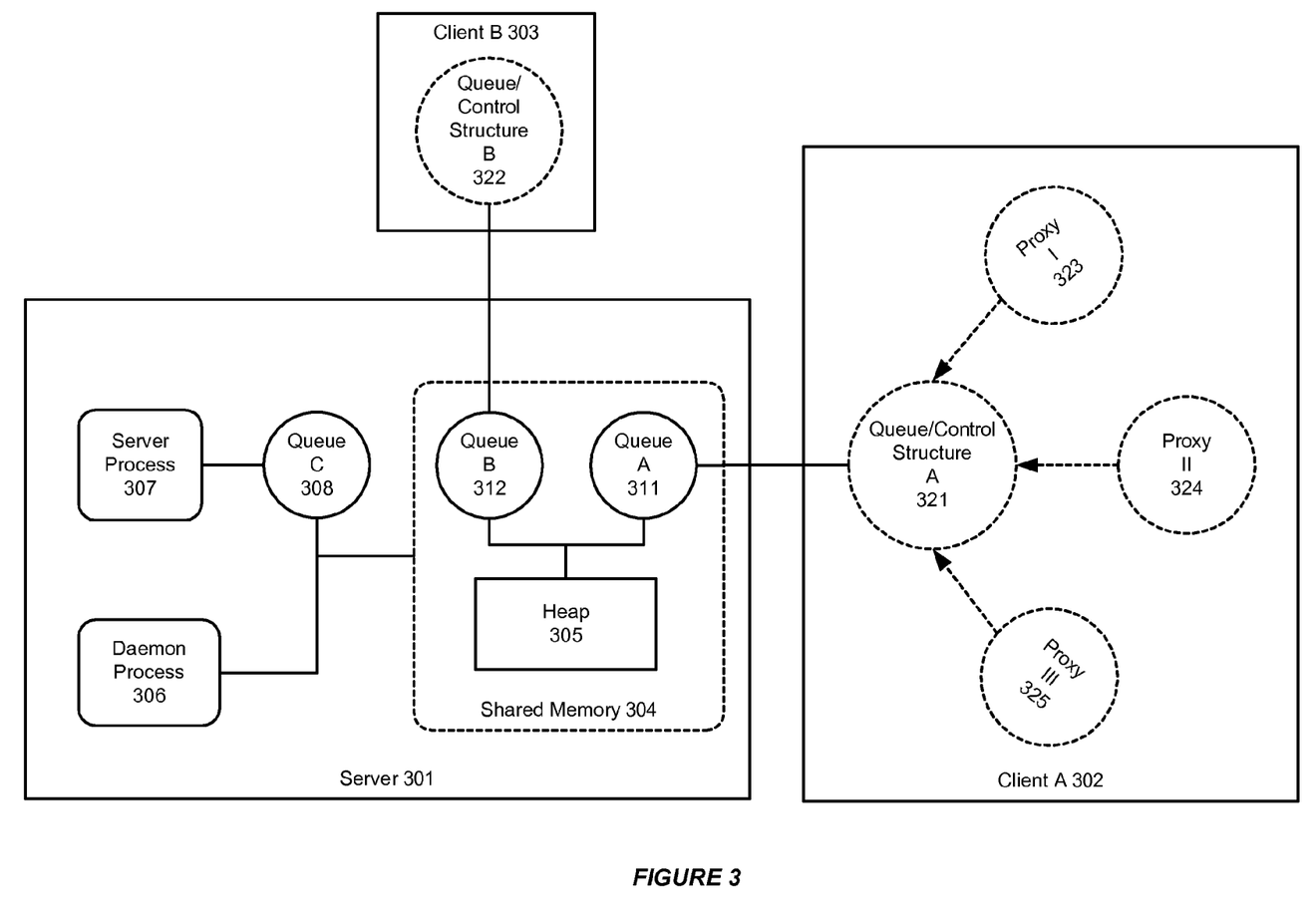
FIG. 3 shows an illustration of a daemon process that can create and manage a message queue in a middleware machine environment, in accordance with an embodiment of the invention.

FIG. 3 shows an illustration of a daemon process that can create and manage a message queue in a middleware machine environment, in accordance with an embodiment of the invention. As shown in FIG. 3, a middleware machine environment can include a server node 301 and several client nodes 302 and 303. The server node can include a shared memory 304 for receiving messages from different clients, wherein the shared memory maintains one or more message queues 311 and 312.

In accordance with an embodiment of the invention, the server node 301 can include a daemon process 306 that is responsible for creating the one or more message queues in the shared memory on the server, when the various clients request the server to set up the message queues for sending and receiving messages. For example, when Client B 303 initiates a connection with the server 301, the daemon process 306 on the server can dynamically create a Queue B 312 for communicating with Client B 303 via a message control structure 322.

In accordance with an embodiment of the invention, this communication scheme between the server and multiple clients can be further extended using proxies. For example, the queue/control structure A 321 on Client A 302 can be extended using one or more proxies, e.g. Proxies I-III 323-325. Using these proxies, the processes associated with the different proxies on Client A can use the queue/control structure A to communicate with the server.

Thus, a great scalability can be achieved in the middleware machine for supporting communication between different servers and clients using the RDMA protocol, since a message initiated from a process on Client A 302 can be sent to the server 301 by allowing the process to write the message directly into the heap data structure 305 on the server 301, without server intervention.

In accordance with an embodiment of the invention, the daemon process 306 on the server 301 can also create and reserve a local message queue, e.g. Queue C 308, for local messaging purpose. In one example, the local server processes can communicate with each other using the local message queue, and the System V IPC protocol can be used instead of the RDMA protocol since the IPC protocol is faster than the RDMA protocol when it is used locally.

As shown in FIG. 3, a local server process 307 can receive messages from a local message queue C 308 in addition to the remote message queues, such as Queue A 311 and Queue B 312. The local server process 307 can handle the messages from the different message queues, without a need to address the difference between a local message queue and a remote message queue.

In accordance with an embodiment of the invention, a client can determine whether a queue or a control structure on the client can be created in a shared memory or private memory. If the client chooses to create the queue or the control structure in a private memory of the client machine that is associated with a particular process, then the system can prevent other processes on the client machine and remote machines to access the control structure on the client. This can be beneficial since some messages can contain sensitive information such as custom financial information.

In accordance with an embodiment of the invention, an interruption can occur on a server process or even the daemon process in a server. The client can continue performing RDMA write operations in the shared memory on the server machine without a need of waiting for the recovery of the server process or the daemon process. This makes the disaster recovery for the system robust and straight-forward. Additionally, the clients can stop writing into the shared memory on the server machine when the queue is full.

Figure 4:
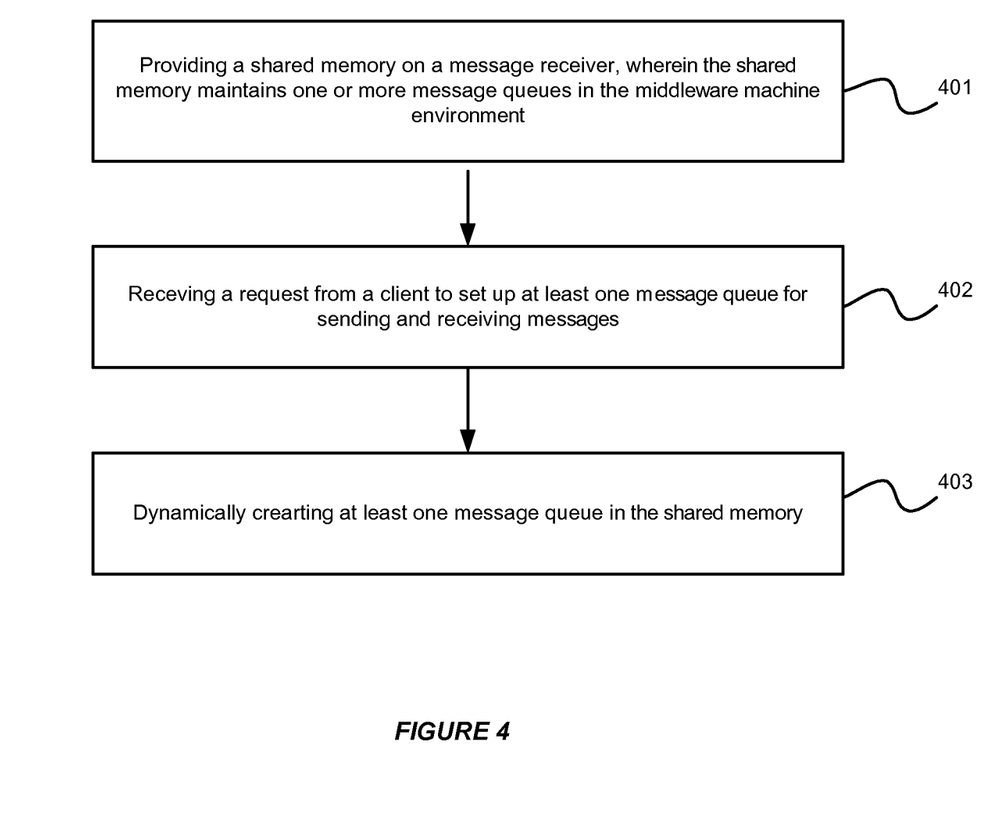
FIG. 4 illustrates an exemplary flow chart for supporting accurate load balance in a transactional middleware machine environment, in accordance with an embodiment of the invention.

FIG. 4 illustrates an exemplary flow chart for creating and managing a message queue in a transactional middleware machine environment, in accordance with an embodiment of the invention. As shown in FIG. 4, at step 401, a server can provide a shared memory on a message receiver, wherein the shared memory maintains one or more message queues in the middleware machine environment. Then, at step 402, a client requests that the at least one message queue be set up on the server to support sending and receiving messages. Finally, at step 403, a daemon process on the server can dynamically create at least one message queue in the shared memory, when the server receives the client request.

Security Model for Protecting a Message Queue

In accordance with an embodiment of the invention, a security model can be used to protect the message queue in the middleware machine environment.

Figure 5:
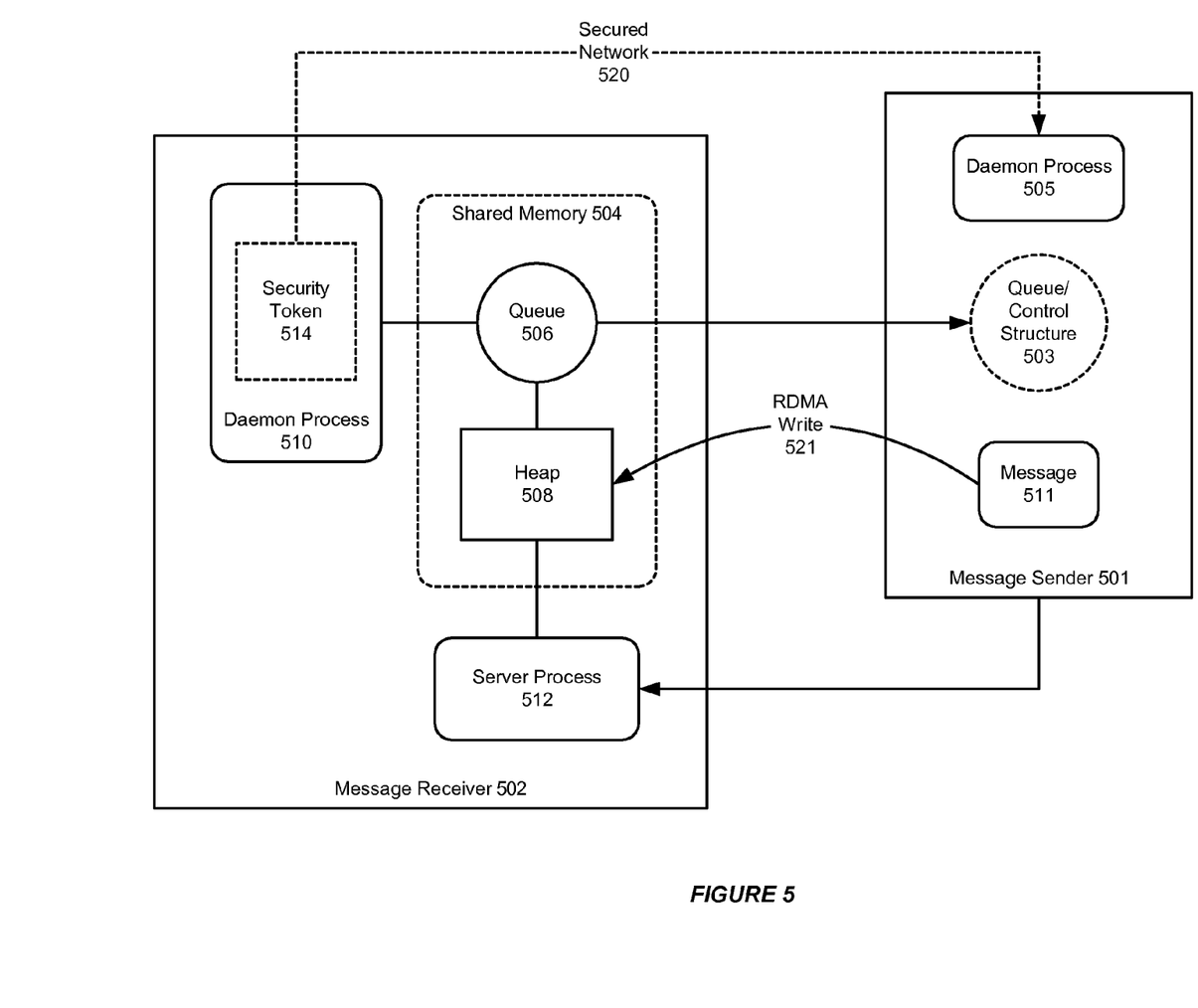
FIG. 5 shows an illustration of a security model that can be used to protect a message queue in a middleware machine environment, in accordance with an embodiment of the invention.

FIG. 5 shows an illustration of a security model that can be used to protect a message queue in a middleware machine environment, in accordance with an embodiment of the invention. As shown in FIG. 5, a message receiver 502 can be configured to communicate with a message sender 501. A daemon process 510 on the server node that is associated with the message receiver 502 can create a key or a security token 514, when the daemon process first creates a message queue 506 in a shared memory 504 on the server machine for communicating with the message sender 501.

In accordance with an embodiment of the invention, the daemon process 510 can further register the key or the security token 514 with the IB network, and send the security token 514 to the message sender 510 on the client node via a secured network 520. As shown in FIG. 5, the message sender 501 can also be associated with a daemon process 505. There can be a separate communication link, for example a dedicated process in the secured network 520, between the daemon process 505 on the message sender 501 and the daemon process 510 on the message receiver 502.

In accordance with an embodiment of the invention, after the message sender 501 receives the security token 514, the message sender 501 can access the shared memory 504 in the receiver machine directly. As shown in FIG. 5, the message sender 501 on the client node can use the security token 514 to perform an RDMA write operation 521 for writing a message directly in a heap data structure 508 in the shared memory 504 on the receiver side.

Figure 6:
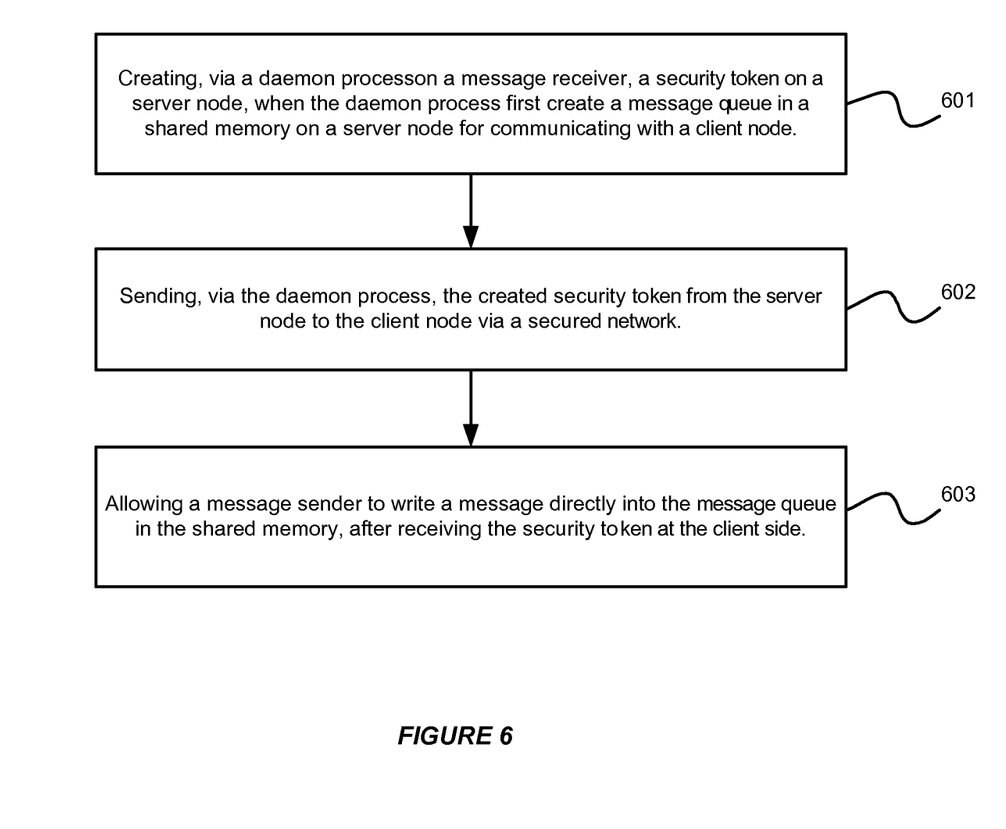
FIG. 6 illustrates an exemplary flow chart for protecting a message queue in a middleware machine environment, in accordance with an embodiment of the invention.

FIG. 6 illustrates an exemplary flow chart for protecting a message queue in a middleware machine environment, in accordance with an embodiment of the invention. As shown in FIG. 6, at step 601, a daemon process on a message receiver can create a security token on a server node, when the daemon process first creates a message queue in a shared memory on the server node for communicating with a client node. Then, at step 602, the daemon process on a message receiver can send the created security token from the server node to the client node via a secured network. Finally, at step 603, after receiving the security token at the client side, the message sender can directly write a message into the message queue in the shared memory.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for managing message queues in a middleware machine environment, comprising:
    a middleware machine environment executing on one or more microprocessors;
    a message receiver and a daemon process associated therewith on a server node in the middleware machine environment, wherein the message receiver includes a shared memory that maintains one or more message queues therein;
    wherein the daemon process operates to
        create, in response to a request from a message sender on a client node, a message queue in the shared memory for communicating with the message sender,
        create a security token associated with the message sender and sending the security token to the message sender,
        accept, from the message sender, a remote direct memory access (RDMA) operation on the shared memory for writing a message directly in the shared memory, responsive to the message sender receiving the security token, and
        receive metadata information of the message via the message queue.

2. The system according to claim 1, wherein different processes on the message sender operate to use at least one proxy to communicate with the message receiver.

3. The system according to claim 1, wherein the daemon process is further configured to send the security token from the server node to the client node via a secured network.

4. The system according to claim 1, wherein the daemon process is configured to create and reserve a local message queue for local messaging.

5. The system according to claim 4, wherein the local message queue is created and reserved outside of the shared memory.

6. The system according to claim 4, wherein a local server process operates to receive messages from both the local message queue and the at least one message queue in the shared memory.

7. The system according to claim 1, wherein the message sender is configured to determine whether a message queue is created on the shared memory or a private memory.

8. The system according to claim 1, wherein the message sender is configured to continue to perform the RDMA operation in the shared memory without waiting for a recovery from an interruption that has occurred on the server node that hosts the shared memory.

9. The system according to claim 1, wherein the daemon process is configured to create and reserve a local message queue for local messaging.

10. A method for managing message queues in a middleware machine environment, comprising:
    providing a shared memory on a message receiver on a sever node executing on one or more microprocessors, wherein the shared memory maintains one or more message queues therein;
    creating, via a daemon process associated with the message receiver, a message queue in the shared memory for communicating with a message sender in response to a request from the message sender; and
    creating a security token and sending the security token to the message sender;
    accepting, from the message sender, a remote direct memory access (RDMA) operation on the shared memory for writing a message directly in the shared memory, responsive to the message sender receiving the security token; and
    receiving metadata information of the message via the message queue.

11. The method according to claim 10, wherein different processes on the message sender operate to use at least one proxy to communicate with the message receiver.

12. The method according to claim 10, wherein the daemon process is further configured to send the security token from the server node to the client node via a secured network.

13. The method according to claim 10, further comprising creating and reserving, via the daemon process, a local message queue for local messaging.

14. The method according to claim 13, wherein the local message queue is created and reserved outside of the shared memory.

15. The method according to claim 13, a local server process is configured to receive messages from both the local message queue and the at least one message queue in the shared memory.

16. The method according to claim 10, the message sender is configured to determine whether a message queue is created on the shared memory or a private memory.

17. The method according to claim 10, wherein the message sender is configured to continue to perform the RDMA operation in the shared memory without waiting for a recovery from an interruption that has occurred on the server node that hosts the shared memory.

18. A non-transitory computer readable storage medium including instructions stored thereon which, when executed by a computer, cause the computer to perform the steps comprising:
    providing a shared memory on a message receiver on a sever node executing on one or more microprocessors, wherein the shared memory maintains one or more message queues therein;
    creating, via a daemon process associated with the message receiver, a message queue in the shared memory for communicating with a message sender in response to a request from the message sender; and creating a security token and sending the security token to the message sender;

accepting, from the message sender, a remote direct memory access (RDMA) operation on the shared memory for writing a message directly in the shared memory, responsive to the message sender receiving the security token; and receiving metadata information of the message via the message queue.

19. The non-transitory computer readable storage medium according to claim 18, wherein different processes on the message sender operate to use at least one proxy to communicate with the message receiver.

20. The non-transitory computer readable storage medium according to claim 18, wherein the daemon process is further configured to send the security token from the server node to the client node via a secured network.

* * * * *

UNITED STATES PATENT AND TRADEMARK OFFICE
CERTIFICATE OF CORRECTION

PATENT NO. : 9,558,048 B2
APPLICATION NO. : 13/572501
DATED : January 31, 2017
INVENTOR(S) : Frank et al.

It is certified that error appears in the above-identified patent and that said Letters Patent is hereby corrected as shown below:

In the Drawings

On sheet 4 of 6, in FIGURE 4, under Reference Numeral 402, Line 1, delete "Receving" and insert -- Receiving --, therefor.

On sheet 4 of 6, in FIGURE 4, under Reference Numeral 403, Line 1, delete "crearting" and insert -- creating --, therefor.

On sheet 4 of 6, in FIGURE 6, under Reference Numeral 601, Line 1, delete "processon" and insert -- process on --, therefor.

In the Claims

In Column 8, Line 15, in Claim 10, delete "sever" and insert -- server --, therefor.

In Column 8, Line 61, in Claim 18, delete "sever" and insert -- server --, therefor.

Signed and Sealed this
Fifteenth Day of August, 2017

Joseph Matal
*Performing the Functions and Duties of the
Under Secretary of Commerce for Intellectual Property and
Director of the United States Patent and Trademark Office*